(12) United States Patent
Chang et al.

(10) Patent No.: US 12,090,100 B2
(45) Date of Patent: Sep. 17, 2024

(54) TELEHEALTH MOVABLE VEHICLE

(71) Applicant: Quanta Computer Inc., Taoyuan (TW)

(72) Inventors: Chia-Yuan Chang, Taoyuan (TW);
Jung-Wen Chang, Taoyuan (TW);
Pao-Hsien Chang, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 341 days.

(21) Appl. No.: 17/827,951

(22) Filed: May 30, 2022

(65) Prior Publication Data

US 2023/0165742 A1 Jun. 1, 2023

(30) Foreign Application Priority Data

Dec. 1, 2021 (TW) .................................. 110214338

(51) Int. Cl.
| A47F 5/00 | (2006.01) |
| A61G 5/10 | (2006.01) |
| F16M 11/26 | (2006.01) |

(52) U.S. Cl.
CPC ............... *A61G 5/10* (2013.01); *F16M 11/26* (2013.01)

(58) Field of Classification Search
CPC ....... A61G 5/10; A61G 2210/00; F16M 11/26
See application file for complete search history.

(56) References Cited

U.S. PATENT DOCUMENTS

| 9,125,502 | B2 * | 9/2015 | Gwag | .................. F16M 13/022 |
| 10,231,795 | B1 * | 3/2019 | Johnson | ................. A47B 97/00 |
| 2020/0336581 | A1 * | 10/2020 | Allen | ..................... F16M 11/16 |

* cited by examiner

*Primary Examiner* — Amy J. Sterling
(74) *Attorney, Agent, or Firm* — McClure, Qualey & Rodack, LLP

(57) ABSTRACT

A telehealth movable vehicle is provided. The telehealth movable vehicle includes a movable part, a fixed member, a slidable member, a bracket, a video/audio transceiver module, and a telescopic rod. The fixed member is affixed to the movable part, and has a guide rail. The slidable member is movably connected to the guide rail. The bracket is affixed to the slidable member. The video/audio transceiver module is disposed on the bracket. The telescopic rod is connected to the fixed member and the slidable member. The telescopic rod is configured to drive the slidable member to move along the guide rail relative to the fixed member.

10 Claims, 8 Drawing Sheets

TELEHEALTH MOVABLE VEHICLE

CROSS REFERENCE TO RELATED APPLICATIONS

This application claims the benefit of Taiwan Patent Application No. 110214338, filed Dec. 1, 2021, the entirety of which is incorporated by reference herein.

BACKGROUND OF THE INVENTION

Field of the Invention

The application relates in general to a telehealth movable vehicle, and in particular, to a telehealth movable vehicle for convenient transport and movement.

Description of the Related Art

Telehealth is a medical technology in development. By combining computers and communications technology with the technology used in the medical profession, doctors can interact with patients even over remote distances to provide diagnoses and caregiving. Telehealth works best with video and sound. However, the equipment needed for recording video and sound needs to be carried and assembled by a staff member. If the patient requiring telehealth service is in a remote place or a narrow alley, it is hard to carry or fit the aforementioned equipment there. Moreover, assembly of the aforementioned equipment also takes time. As a result, manpower and time are wasted. Therefore, how to address the aforementioned problem has become an important issue.

BRIEF SUMMARY OF INVENTION

To address the deficiencies of conventional products, an embodiment of the invention provides a telehealth movable vehicle, including a movable part, a fixed member, a slidable member, a bracket, a video/audio transceiver module, and a telescopic rod. The fixed member is affixed to the movable part, and has a guide rail. The slidable member is movably connected to the guide rail. The bracket is affixed to the slidable member, and the video/audio transceiver module is disposed on the bracket. The telescopic rod is connected to the fixed member and the slidable member, and configured to drive the slidable member to move along the guide rail relative to the fixed member.

In some embodiments, the video/audio transceiver module includes a video/audio transceiver member and a display member. Both the video/audio transceiver member and the display member are disposed on the bracket. A receiving space is formed between the bracket and the video/audio transceiver module.

In some embodiments, the telehealth movable vehicle further includes a carrier, and the carrier includes a frame and a holding portion. The frame is connected to the slidable member. The holding portion is pivotally connected to the frame, and the display member is disposed between the slidable member and the holding portion.

In some embodiments, the holding portion has a surface facing the slidable member, and the carrier further includes a soft member disposed on the holding portion and protruding from the surface.

In some embodiments, the slidable member includes a slider, a board, and a connecting component. The slider is movably connected to the guide rail, the board is connected to the slider, the connecting component is connected to the board, and the bracket is affixed to the connecting component.

In some embodiments, the connecting component has a first wall and a second wall, the board is connected to the first wall, the bracket is connected to the second wall, and an accommodating space is formed between the first wall and the second wall.

In some embodiments, the first wall is inclined relative to the second wall.

In some embodiments, the movable part includes a seat and a back connected to each other, and an obtuse angle is formed between the seat and the back, wherein the second wall is substantially perpendicular to the seat.

In some embodiments, the telehealth movable vehicle further includes a first position-limiting member disposed on the fixed member. When the first position-limiting member is opened and the slidable member is in the first position, the first position-limiting member is in contact with the top surface of the slidable member. When the first position-limiting member is closed, the first position-limiting member is separated from the top surface, and the slidable member moves from the first position to the second position due to the driving force from the telescopic rod.

In some embodiments, the telehealth movable vehicle further includes a second position-limiting member disposed on the fixed member. When the slidable member moves into the second position and the second position-limiting member is opened, the second position-limiting member is in contact with the bottom surface of the slidable member.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the telehealth movable vehicle are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
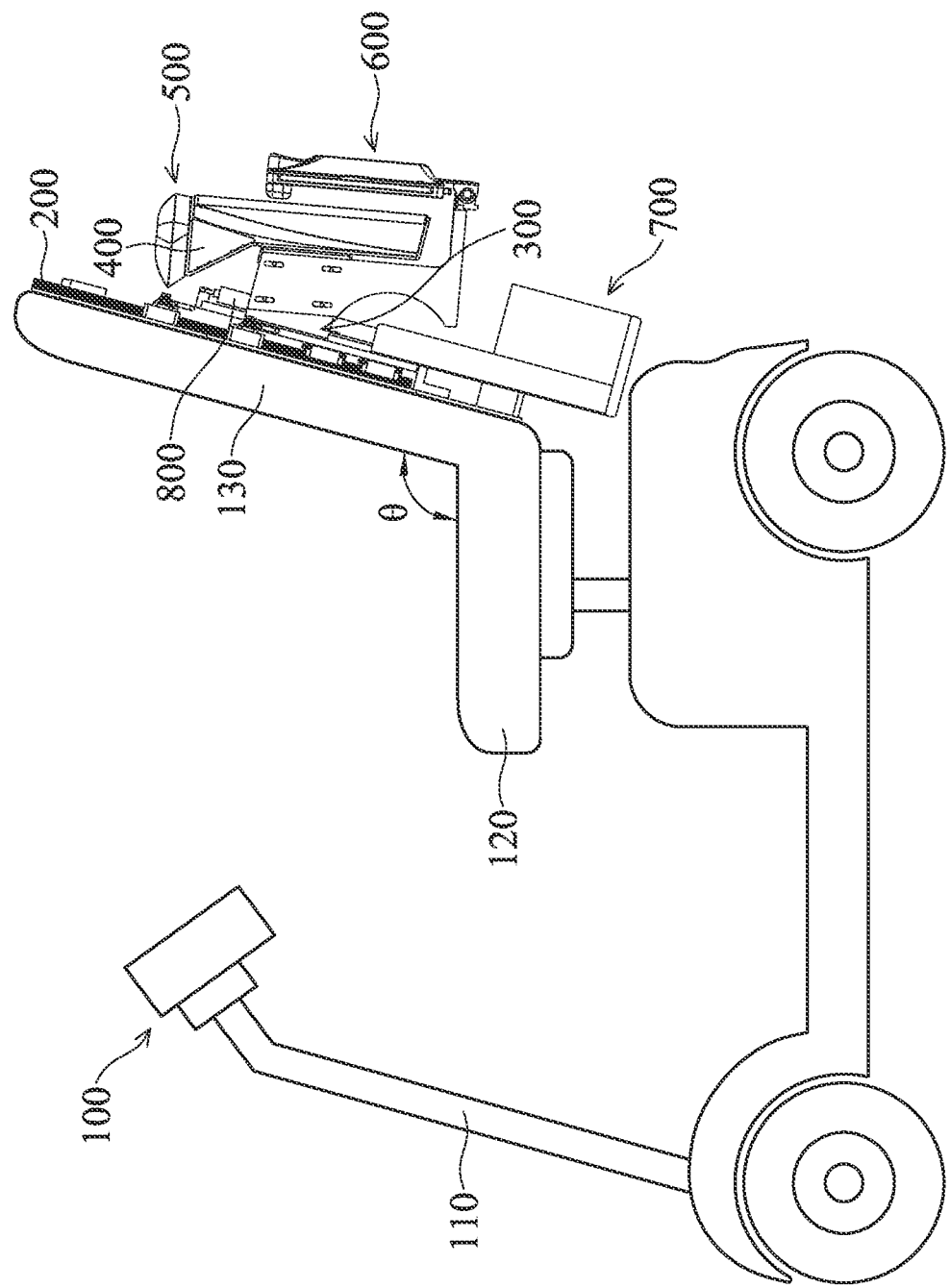
FIG. 1 is a schematic diagram of a telehealth movable vehicle according to an embodiment of the invention.

Referring to FIG. 1, a telehealth movable vehicle V according to an embodiment of the invention primarily includes a movable part 100, a fixed member 200, a slidable member 300, a bracket 400, a video/audio transceiver module 500, a carrier 600, a power supply module 700, and a telescopic rod 800.

For example, the movable part 100 can include a vehicle body 110, a seat 120, and a back 130. The seat 120 is disposed on the vehicle body 110, and the back 130 is connected to the seat 120. The fixed member 200 is affixed to the back 130, and the slidable member 300, the bracket 400, the video/audio transceiver module 500, the carrier 600, the power supply module 700, and the telescopic rod 800 are connected to the movable part 100 via the fixed member 200. In this embodiment, the vehicle body 110 can be an electric mobility scooter, so that it can enter narrow alleys where a normal-sized car cannot enter.

Figure 2A:
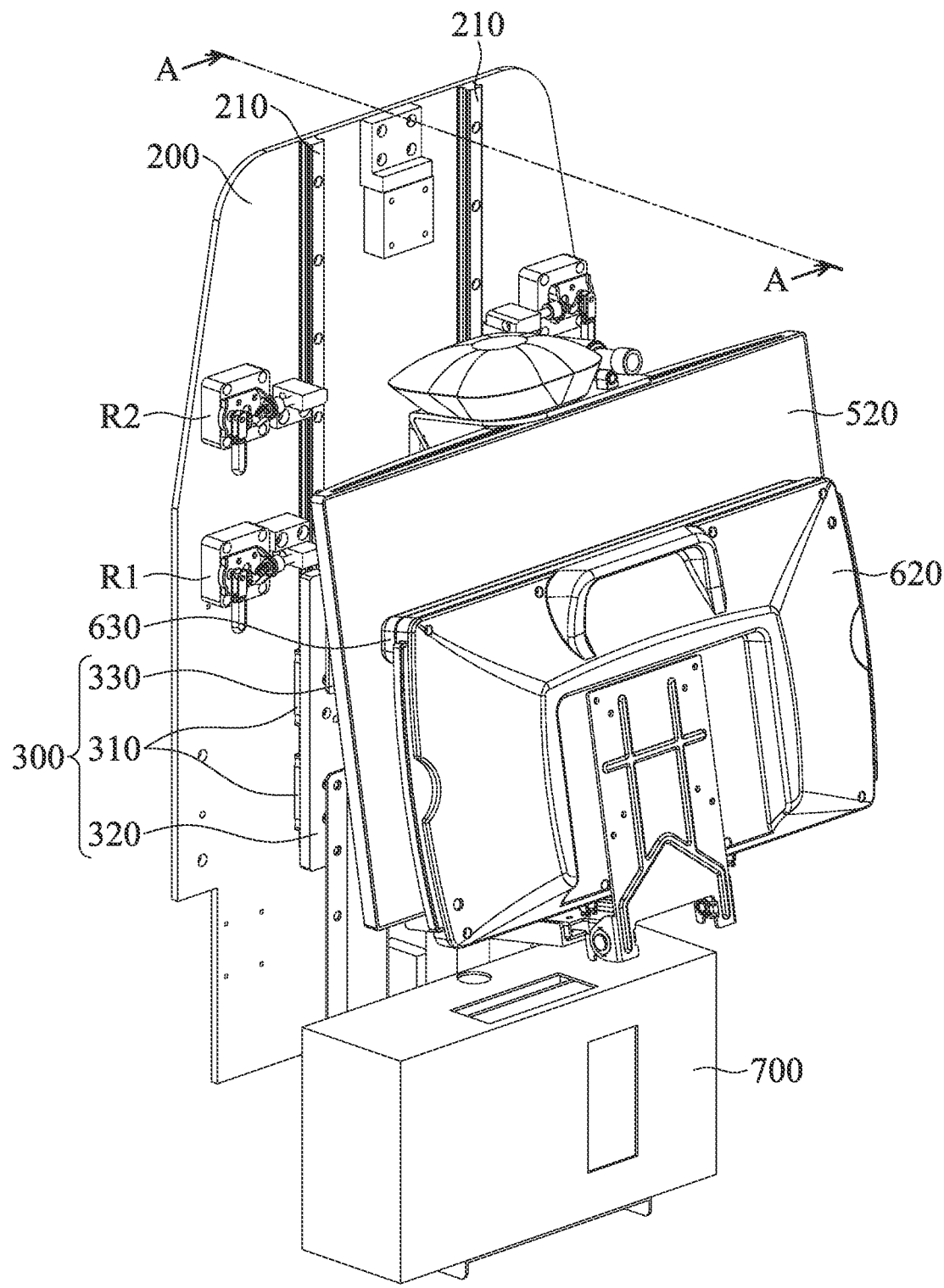
FIG. 2A is a schematic diagram of a fixed member, a slidable member, a bracket, a video/audio transceiver module, a carrier, a power supply module, and a telescopic rod according to an embodiment of the invention.
Figure 2B:
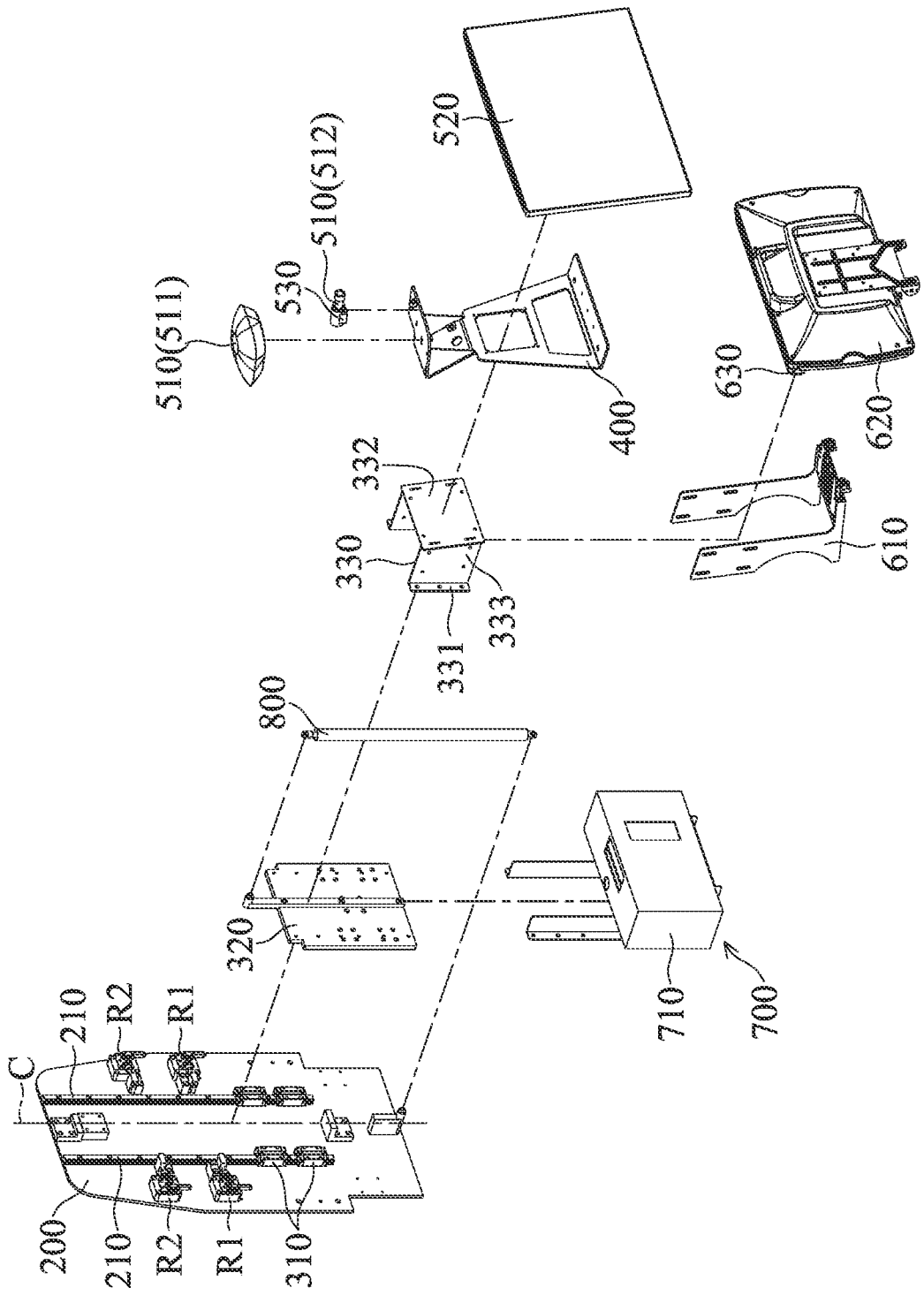
FIG. 2B is an exploded-view diagram of the fixed member, the slidable member, the bracket, the video/audio transceiver module, the carrier, the power supply module, and the telescopic rod according to an embodiment of the invention.
Figure 2C:
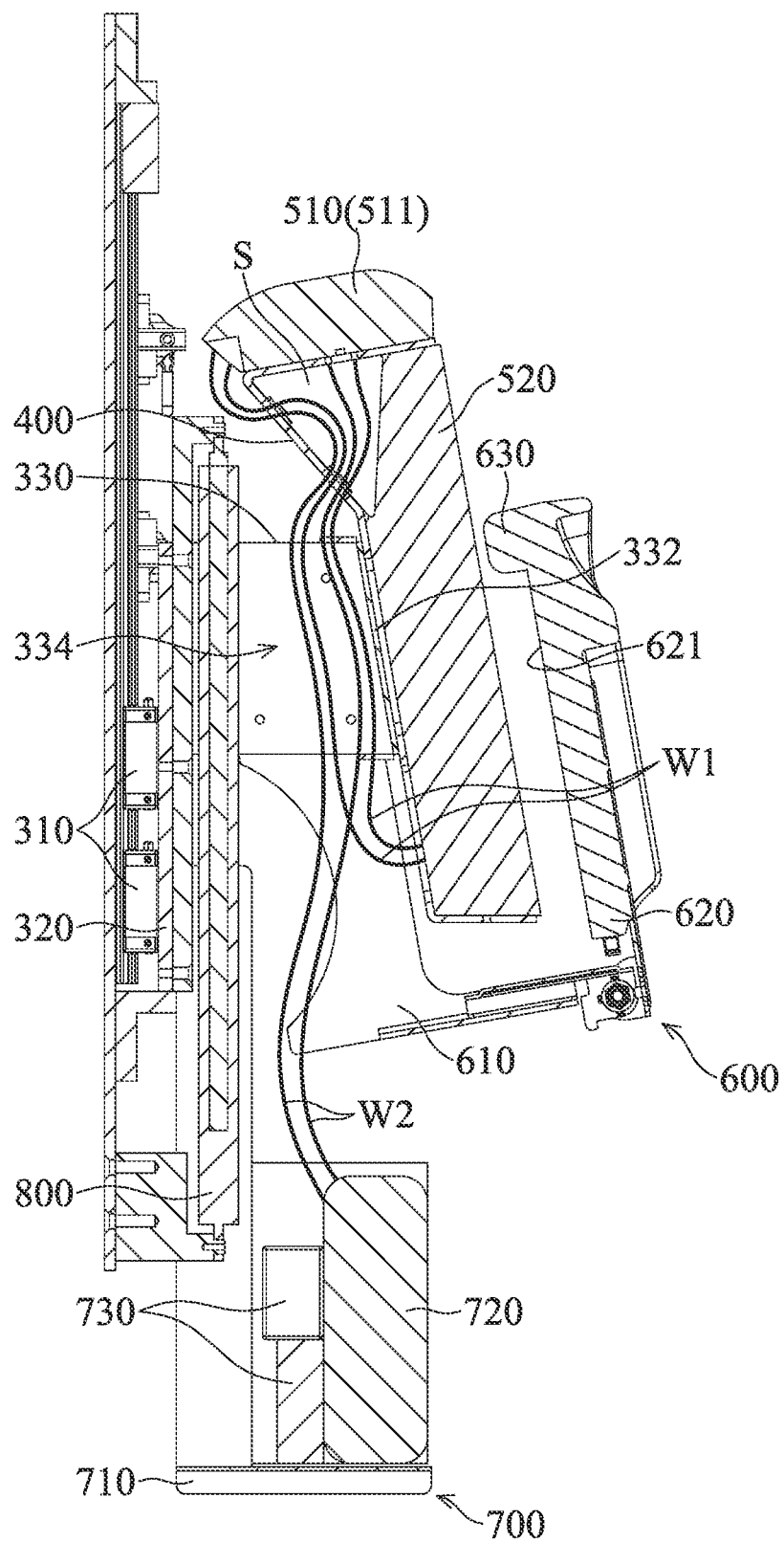
FIG. 2C is a cross-sectional view taken along the line A-A in FIG. 2A.

FIG. 2A and FIG. 2B respectively represents a schematic diagram and an exploded-view diagram of the fixed member 200, the slidable member 300, the bracket 400, the video/audio transceiver module 500, the carrier 600, the power supply module 700, and the telescopic rod 800 in the telehealth movable vehicle V, and FIG. 2C is a cross-sectional view taken along the line A-A in FIG. 2A. As shown in FIG. 1 to FIG. 2C, the fixed member 200 has a plate structure, and at least one guide rail 210 is disposed thereon. The slidable member 300 includes at least one slider 310, a board 320, and a connecting component 330. The slider 310 is slidably connected to the guide rail 210, the board 320 is affixed to the slider 310, and the connecting component 330 is affixed to the board 320. Therefore, when the slider 310 moves along the guide rail 210 on the fixed member 200, the board 320 and the connecting component 300 can be driven to move along the guide rail 210.

In this embodiment, there are two guide rails 210 parallel to each other disposed on the fixed member 200, and there are two sliders 310 are disposed on each of the guide rails 210. The sliders 310 are symmetric relative to a central line C of two guide rails 210. Thus, the moving stability of the slidable member 300 can be enhanced. In another embodiment, different number of sliders 310 can be disposed on each of the guide rails 210 as required.

In this embodiment, at least one first position-limiting member R1 and at least one second position-limiting member R2 are disposed on the fixed member 200. For example, each of the first position-limiting member R1 and the second position-limiting member R2 can be a solenoid valve or a manual valve.

When the connecting component 330 is affixed to the board 320, the board 320 is affixed to a first wall 310 that is situated at a side of the connecting component 330, and the bracket 400 is affixed to a second wall 332 that is situated at an opposite side of the connecting component 330. The first wall 331 and the second wall 332 can be connected to each other via a lateral wall 333, so that an accommodating space 334 can be formed between the first wall 331 and the second wall 332. In a specific embodiment, the connecting component 330 substantially has a U-shaped appearance.

Specifically, in this embodiment, an obtuse angle θ can be formed between the back 130 and the seat 120, and the second wall 332 of the connecting component 330 is inclined according to the obtuse angle θ. Therefore, when the slidable member 330 is connected to the back 130 via the fixed member 200, the second wall 332 is substantially perpendicular to the seat 120.

Referring to FIG. 1 to FIG. 2C, the video/audio transceiver module 500 includes one or more video/audio transceiver members 510 and a display member 520. The video/audio transceiver members 510 and the display member 520 are affixed to the bracket 400. For example, the video/audio transceiver members 510 can include a camera 511 and a microphone 512, and the display member 520 can include a monitor (such as a liquid-crystal display (LCD) or a light-emitting diode (LED) display). In an embodiment, the video/audio transceiver members 510 and the display member 520 can be affixed to the bracket 400 via the screw(s), and the microphone 512 can be affixed to the bracket 400 by adhering. In an embodiment, a soft material 530 is disposed between the microphone 512 and the bracket 400, so as to absorb the vibration caused by the operation of the aforementioned members, and the situation in that the microphone 512 records the noise can be reduced.

As shown in FIG. 2C, the camera 511 and the microphone 512 can be electrically connected to the display member 520 via the wires W1, so as to transmit the signal to the display member 520. The wires W1 can enter a receiving space S that is surrounded and formed by the bracket 400 and the display member 520, and pass the accommodating space 334 of the connecting component 330 to connect the display member 520. Thus, when the wires W1 have long lengths, the redundant wires W1 can be accommodated in the receiving space S, and the damage of the wires W1 caused by pulling during the movement of the slidable member 300 can be prevented.

The carrier 600 include a frame 600 and a holding portion 620. The frame 610 is affixed to the lateral wall 333 of the connecting component 330, and extended toward a direction that is away from the fixed member 200. The holding portion 620 is pivotally connected to the frame 610. When the holding portion 620 of the carrier 600 is in a close position, the display member 520 is disposed between the slidable member 300 and the holding portion 620. The holding portion 620 is spaced away from the display member 520 and covers the whole or a portion of the screen of the display member 520. Therefore, when the vehicle body 110 of the telehealth movable vehicle V moves, the holding portion 620 can be used to protect the screen of the display member 520. In this embodiment, a soft member (or an elastic member) 630 is disposed on a surface 621 of the holding portion 620 facing the display member 520, and the soft member 630 protrudes from the surface 621. Therefore, the screen of the display member 520 can have further protection. For example, the soft member 630 can include plastic or rubber, but it is not limited thereto.

When the holding portion 620 of the carrier member 600 rotates relative to the frame 610 from the close position to an open position, the holding portion 620 of the carrier member 600 can be used to support an input device (not shown). For example, the input device can be a keyboard or a touchpad. In some embodiments, the input device can be directly embedded in or disposed on the holding portion 620.

The power supply module 700 includes a case 710, at least on battery 720, and at least one adapter 730, wherein the case 710 is affixed to the board 320 of the slidable member 300, and the battery 720 and the adapter 730 are disposed in the case 710.

The video/audio transceiver members 510 of the video/audio transceiver module 500 (the camera 511 and the microphone 512) can be electrically connected to the power supply module 700 via the wires W2, so that the power supply module 700 can provide power to the video/audio transceiver members 510. Similar to the wires W1, the wires W2 can enter the receiving space S that is surrounded and formed by the bracket 400 and the display member 520, and pass the accommodating space 334 of the connecting component 330 to connect the power supply module 700. Thus, when the wires W2 have long lengths, the redundant wires W2 can be accommodated in the receiving space S, and the damage of the wires W2 caused by pulling during the movement of the slidable member 300 can be prevented. In some embodiments, the display member 520 can also be electrically connected to the power supply module 700 via a wire.

The telescopic rod 800 is connected to the fixed member 200 and the slidable member 300, and is configured to drive the slidable member 300 to move relative to the fixed member 200. In this embodiment, the telescopic rod 800 is a nitrogen gas spring, so that it can continuously provide an upward driving force to the slidable member 300. In some embodiments, the telescopic rod 800 is a screw rod.

Figure 3A:
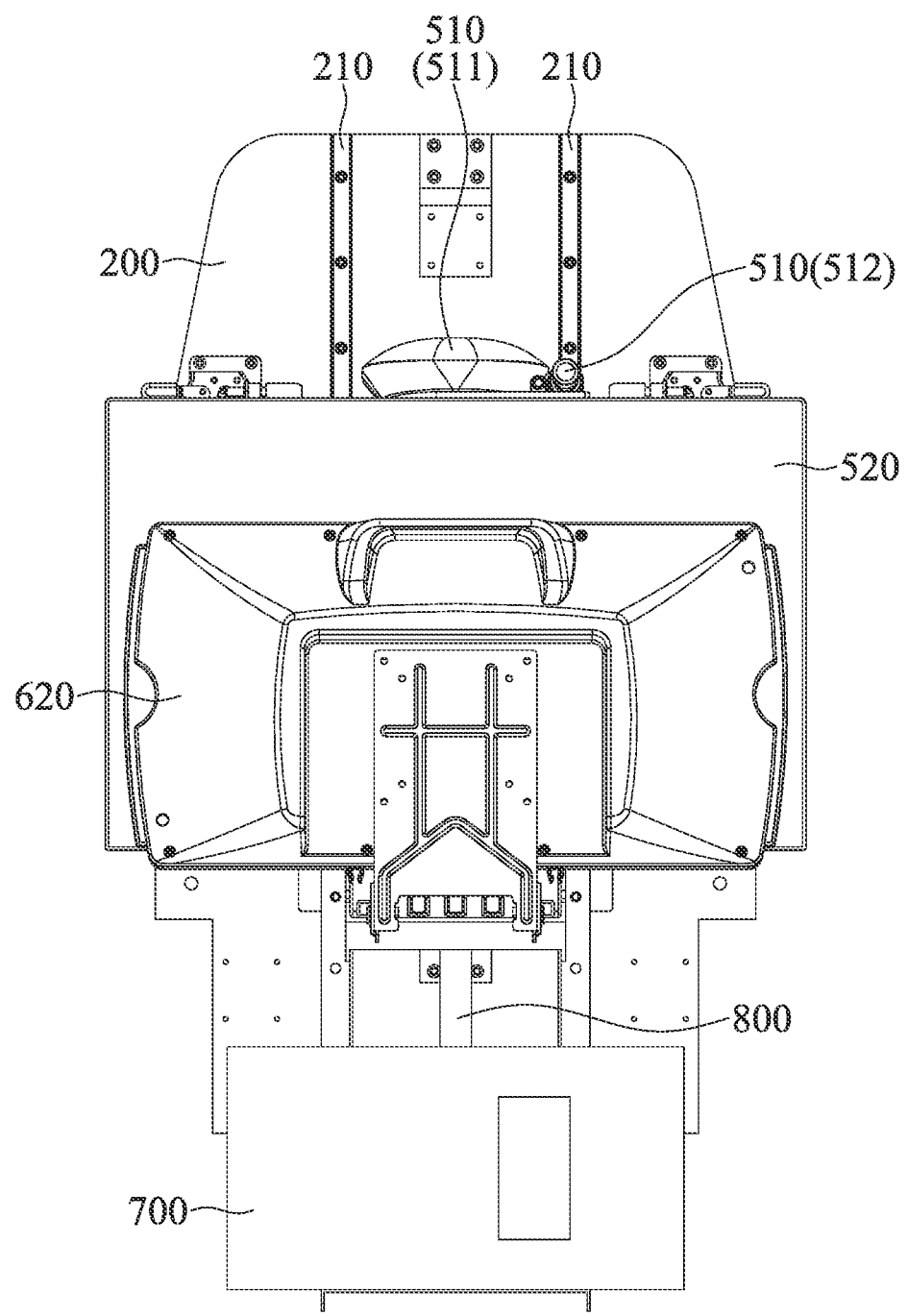
FIG. 3A is a schematic diagram of the fixed member, the slidable member, the bracket, the video/audio transceiver module, the carrier, the power supply module, and the telescopic rod when a board is in the first position according to an embodiment of the invention.
Figure 3B:
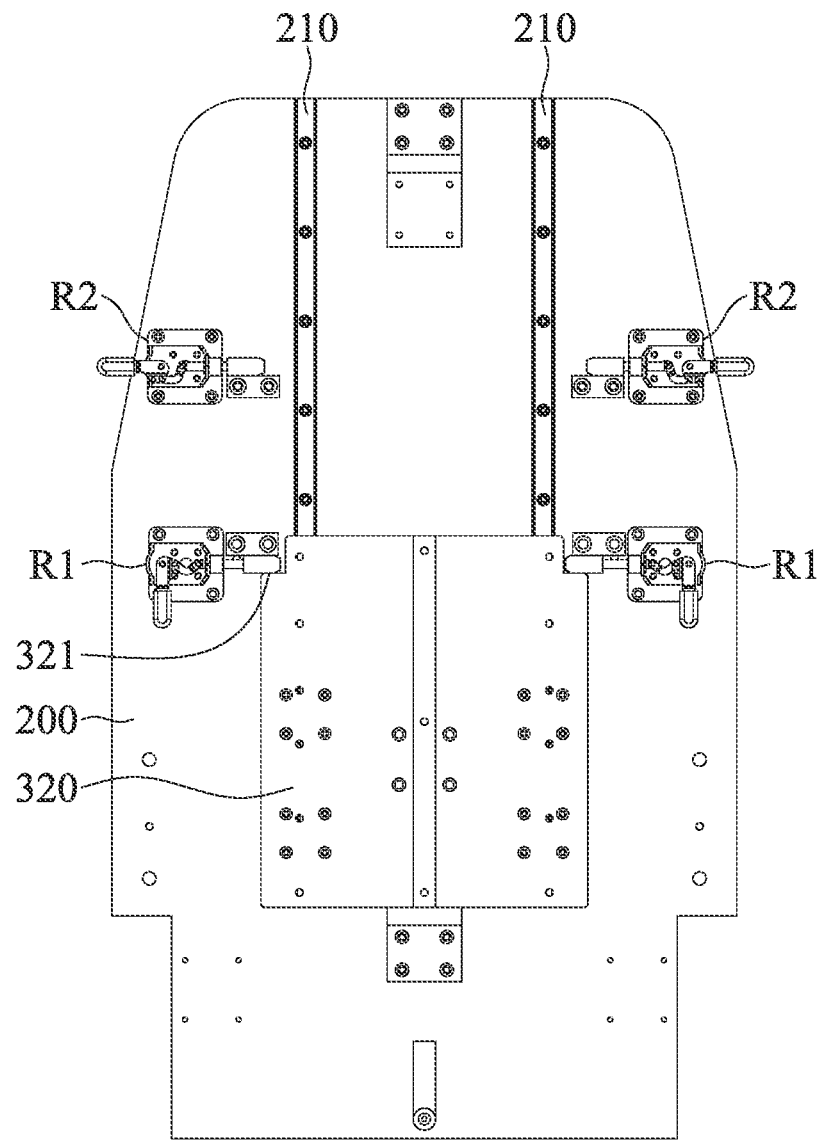
FIG. 3B is a schematic diagram of the board in the first position according to an embodiment of the invention.

The usage method of the telehealth movable vehicle V is discussed below. As shown in FIG. 3A and FIG. 3B, when the user wants to move or transport the telehealth movable vehicle V, the first position-limiting member R1 can be opened, the top surface 321 of the board 320 of the slidable member 300 is in contact with the first position-limiting member R1 due to the upward driving force continuously provided by the telescopic rod 800. Thus, the board 320 can be affixed in a first position. Since all the members behind the movable part 100 do not exceed the top end of the back 130, the height of the telehealth movable vehicle V can be reduced, and the telehealth movable vehicle V can be loaded into a normal car to be transported. Otherwise, the movable part 100 can operate to move the telehealth movable vehicle V, the members behind the movable part 100 can be protected from impact when the telehealth movable vehicle V moves even if the user does not pay attention to the height.

Figure 4A:
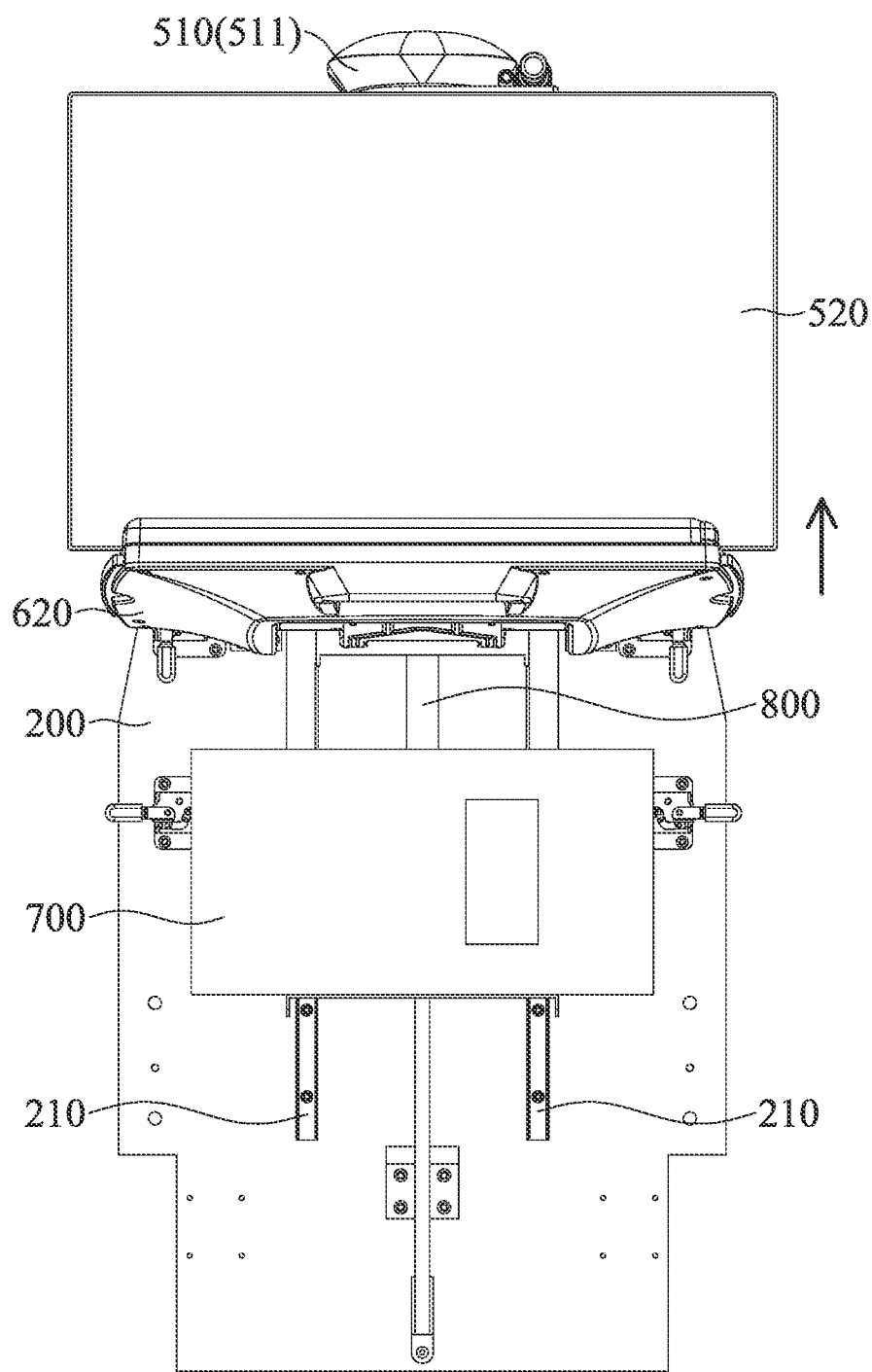
FIG. 4A is a schematic diagram of the fixed member, the slidable member, the bracket, the video/audio transceiver module, the carrier, the power supply module, and the telescopic rod when the board moves from the first position to a second position according to an embodiment of the invention.
Figure 4B:
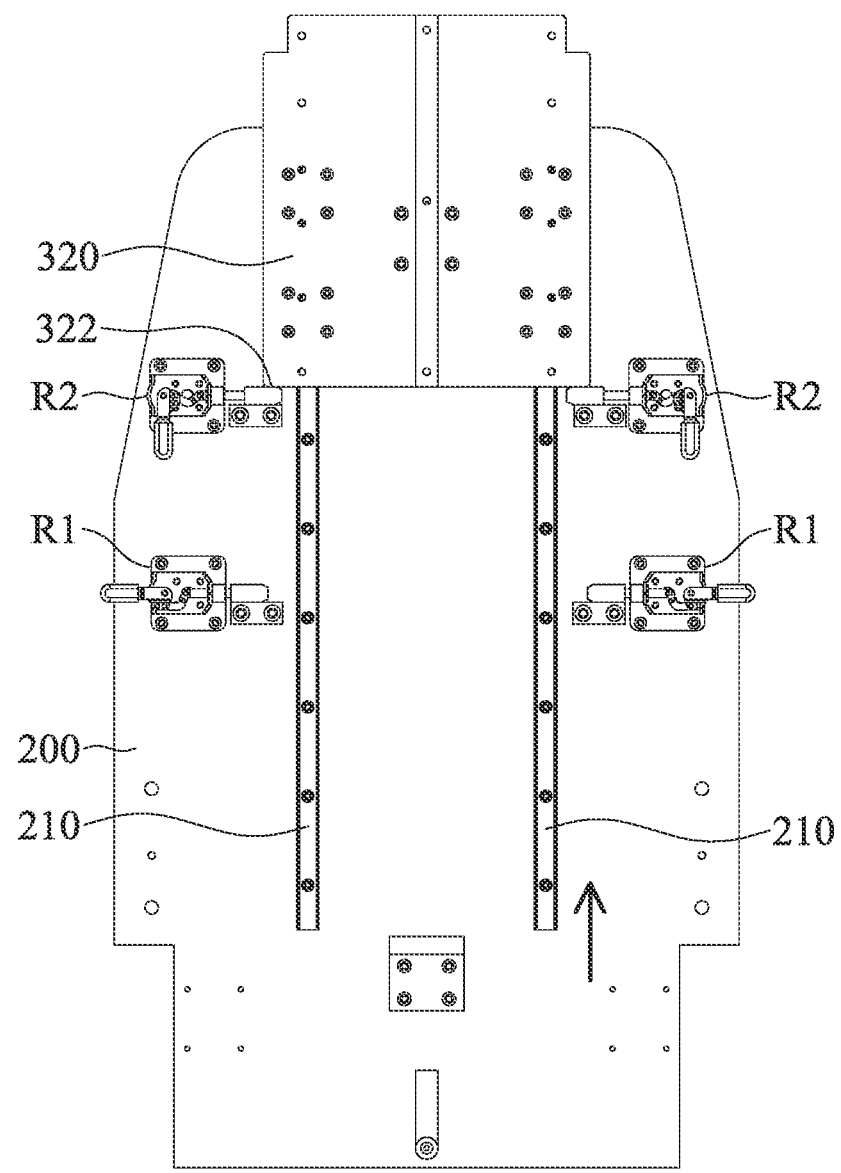
FIG. 4B is a schematic diagram of the board in the second position according to an embodiment of the invention.

Referring to FIG. 4A and FIG. 4B, when the user wants to use the telehealth movable vehicle V to provide telehealth service, the first position-limiting member R1 can be closed, the upward driving force that is continuously provided by the telescopic rod 800 can drive the board 320 of the slidable member 300 to move from the first position to the second position. At this time, the user can open the second position-limiting member R2, and the second position-limiting member R2 can be in contact with the bottom surface 322 of the board 320. The holding portion 620 can rotate relative to the frame 610, and the input device can be disposed on the holding portion 620. Since the second position-limiting member R2 is in contact with the bottom surface 322 of the board 320, the slidable member 300 does not move downwardly when the user uses the input device. In some embodiments, the telescopic rod 800 can provide enough driving force, so that the second position-limiting member R2 can be omitted.

After the holding portion 620 rotates relative to the frame 610, the holding portion 620 does not cover the display member 520, the user can therefore watch the image on the display member 520. Moreover, since the video/audio transceiver module 500 rises to the position exceeding the top end of the back 130, the user can use the video/audio transceiver members 510 (the camera 511 and the microphone 512) of the video/audio transceiver module 500 at the suitable height. The image and the sound obtained by the video/audio transceiver members 510 can be transmitted through the internet to, for example, the computer used by the doctor in the hospital, and the doctor can diagnose according to the received image and sound, and can immediately indicate to the staff beside the telehealth movable vehicle V the actions to be taken.

Since the second wall 332 is inclined relative to the first wall 331 according to the obtuse angle θ between the back 130 and the seat 120, the screen of the display member 520 can face the user uprightly to facilitate the user to watch.

Furthermore, it should be noted that, since the video/audio transceiver members 510, the display member 520, and the power supply module 700 can move with the movement of the slidable member 300, the relative positions of the wires W1 and W2 do not change. Thus, the damage probability of the wires W1 and W2 can be reduced.

In summary, a telehealth movable vehicle is provided, including a movable part, a fixed member, a slidable member, a bracket, a video/audio transceiver module, and a telescopic rod. The fixed member is affixed to the movable part, and has a guide rail. The slidable member is movably connected to the guide rail. The bracket is affixed to the slidable member, and the video/audio transceiver module is disposed on the bracket. The telescopic rod is connected to the fixed member and the slidable member, and configured to drive the slidable member to move along the guide rail relative to the fixed member.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A telehealth movable vehicle, comprising:
a movable part;
a fixed member, affixed to the movable part and having a guide rail;
a slidable member, movably connected to the guide rail;
a bracket, affixed to the slidable member;
a video/audio transceiver module, disposed on the bracket; and
a telescopic rod, connected to the fixed member and the slidable member, and configured to drive the slidable member to move along the guide rail relative to the fixed member.

2. The telehealth movable vehicle as claimed in claim 1, wherein the video/audio transceiver module comprises:
a video/audio transceiver member, disposed on the bracket; and
a display member, disposed on the bracket, wherein a receiving space is formed between the bracket and the video/audio transceiver module.

3. The telehealth movable vehicle as claimed in claim 2, wherein the telehealth movable vehicle further comprises a carrier, and the carrier comprises:
a frame, connected to the slidable member; and
a holding portion, pivotally connected to the frame, wherein the display member is disposed between the slidable member and the holding portion.

4. The telehealth movable vehicle as claimed in claim 3, wherein the holding portion has a surface facing the slidable member, and the carrier further comprises a soft member disposed on the holding portion and protruding from the surface.

5. The telehealth movable vehicle as claimed in claim 1, wherein the slidable ember comprises:
a slider, movably connected to the guide rail;
a board, connected to the slider; and
a connecting component, connected to the board, wherein the bracket is affixed to the connecting component.

6. The telehealth movable vehicle as claimed in claim 5, wherein the connecting component has a first wall and a second wall, the board is connected to the first wall, the bracket is connected to the second wall, and an accommodating space is formed between the first wall and the second wall.

7. The telehealth movable vehicle as claimed in claim 6, wherein the first wall is inclined relative to the second wall.

8. The telehealth movable vehicle as claimed in claim 7, wherein the movable part comprises a seat and a back connected to each other, and an obtuse angle is formed between the seat and the back, wherein the second wall is substantially perpendicular to the seat.

9. The telehealth movable vehicle as claimed in claim 1, wherein the telehealth movable vehicle further comprises a first position-limiting member disposed on the fixed member, wherein when the first position-limiting member is opened and the slidable member is in a first position, the first position-limiting member is in contact with a top surface of the slidable member, wherein when the first position-limiting member is closed, the first position-limiting member is separated from the top surface, and the slidable ember moves from the first position to a second position due to a driving force from the telescopic rod.

10. The telehealth movable vehicle as claimed in claim 9, wherein the telehealth movable vehicle further comprises a second position-limiting member disposed on the fixed member, wherein when the slidable member moves into the second position and the second position-limiting member is opened, the second position-limiting member is in contact with a bottom surface of the slidable member.

* * * * *